United States Patent Office 2,980,674
Patented Apr. 18, 1961

2,980,674

DIAMINONITROPROPIOPHENONES AND PROCESS OF PREPARATION

Carlo Giuseppe Alberti and Alberto Vercellone, Milan, Italy, assignors to Società Farmaceutici Italia, a corporation of Italy No Drawing. Filed Dec. 10, 1957, Ser. No. 701,736

Claims priority, application Italy Apr. 29, 1954

4 Claims. (Cl. 260—247.2)

This invention relates to new synthetic products and to a process for their preparation. This application is a continuation-in-part of application Serial No. 504,340, filed April 27, 1955, now abandoned.

More particularly, the invention relates to α-acylamino-β-aminonitropropiophenones, having the general formula

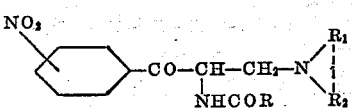

wherein R represents a lower alkyl or dihaloalkyl and $R_1$ and $R_2$ individually represent a lower alkyl and jointly with the nitrogen to which they are bound a saturated heterocyclic ring which may contain an oxygen atom.

These compounds have been found to be important because of their pronounced antiseptic properties. In particular they have, in numerous "in vitro" tests, shown a fungicidal activity against many varieties of fungi, both of the plant and of the animal parasite type. They may be applied to combat fungi on animal organism in the usual forms of ointments, solutions etc., while for agricultural uses they may be conveniently diluted with inert solid carriers for dusting, or in solution or emulsion prepared by means of inert liquid materials for spraying.

According to this invention, the process of synthesizing these compounds consists in adding one mol of an α-acylamino-nitroacrylophenone of the formula

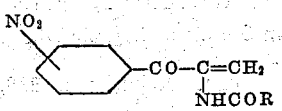

wherein R is a lower alkyl or dihaloalkyl to one mol of a secondary amine, having the general formula

wherein $R_1$ and $R_2$ individually represent a lower alkyl and jointly with the nitrogen to which they are bound a saturated heterocyclic ring which may contain an oxygen atom.

The materials are reacted in stoichiometric ratio, in the presence of an inert solvent, such as aliphatic and aromatic hydrocarbons esters, alcohols or ethers, and at temperatures ranging from about 0° to about 100° C.

As set forth in the copending application Serial No. 603,181 of August 9, 1956, the α-acylaminonitroacrylophenone starting material is obtained by oxidizing N,O-diacyl derivatives of the nitrophenyl amino-propanediols to form α-acylamino-β-acyloxy-propiophenones and eliminating the acyloxy group in β-position, in the form of an acid, due to the union with the hydrogen in α-position.

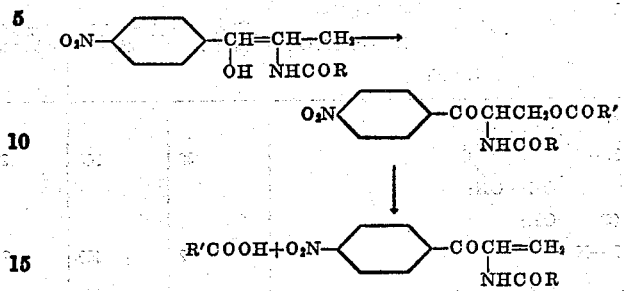

In order to illustrate the herein-disclosed process, the following examples are presented, without however restricting thereby the scope of the invention.

EXAMPLE 1

9.1 g. of p-nitro-α-dichloroacetamino-acrylophenone are suspended in 75 cc. of benzene and treated with 2.61 g. of morpholine. After standing overnight at room temperature, the resulting crystalline precipitate is filtered off, yielding 11.0 g. of p.nitro-α-dichloroacetamino-β-(4-morpholinyl)-propiophenone having, after recrystallization from ethanol, a M.P. of 133° C.

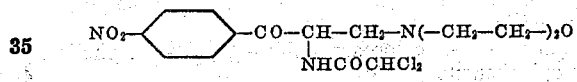

EXAMPLE 2

11.3 g. of p-nitro-α-dichloroacetamino-acrylophenone and 1.67 g. of dimethylamine are kept in benzene, at room temperature, for 15 to 18 hours. After that time, 12.15 g. of p.nitro-α-dichloroacetamino-β-dimethylamino-propiophenone, in the form of yellow needles melting at 94–95° C., are filtered off.

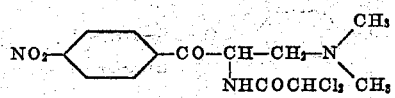

EXAMPLE 3

12.0 g. of p-nitro-α-dichloroacetamino-acrylophenone and 3.3 g. of piperidine in benzene are stirred at room temperature. After 15 to 18 hours the solvent is removed by evaporation and the residue recrystallized from benzene-petroleum ether. 9.95 g. of p-nitro-α-dichloroacetamino-β-piperidine-propiophenone are obtained in form of yellow dust.

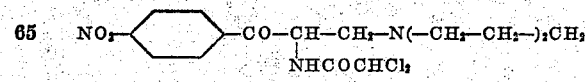

All compounds described in the examples, show "in vitro" (ager-potato medium) a fungicidal activity.

Table I illustrates the minimum growth inhibitory doses in γ/cc. of the herein-claimed compounds in connection with *Alternaria solani, Aspergillus niger, Candida albicans* and *Penicillium notatum*.

Table 1

| Compounds | Fungicidal activity | | | |
|---|---|---|---|---|
| $NO_2-\langle\rangle-CO-CH-CH_2-$ <br> $\qquad\qquad\qquad\qquad\mid$ <br> $\qquad\qquad\qquad\qquad NHCOCHCl_2$ <br> (R radical) | Alternaria solani | Aspergillus niger | Candida albicans | Penicillium notatum |
| (1) $R-N\begin{array}{c}CH_2-CH_2\\ \phantom{R-N}\\ CH_2-CH_2\end{array}O$ | 80 | 100 | 20 | 60 |
| (2) $R-N\begin{array}{c}CH_3\\ \phantom{R-N}\\ CH_3\end{array}$ | 12 | 400 | 25 | 400 |
| (3) $R-N\begin{array}{c}CH_2-CH_2\\ \phantom{R-N}CH_2\\ CH_2-CH_2\end{array}$ | 12 | 600 | 25 | 600 |

Compounds 1, 2 and 3 are the products described in Examples 1, 2 and 3.

Moreover, p-nitro-α-dichloroacetamino-β-(4-morpholynil)-propiophenone in a concentration of 100 γ/cc. in Sabouraud medium shows growth inhibiting action against the following fungi: *Debaryomyces canensis, D. guillermondi, D. hudeloi, D. marylandii, D. neoformans, D. tyrocola, Epidermophyton interdigitale, Glenospora graphii, Glenosporella dermatitidis, Histoplasma capsulatum, Pseudomycoderma metalense, Torulopsis neoformans, Tricophyton teggini, T. plicatile, Actinomyces noströmi* Vitt. and *Nocardia esteroides*.

We claim:

1. p.nitro - α - dichloroacetamino - β - (4 - morpholinyl)-propiophenone

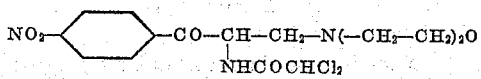

2. p.nitro - α - dichloroacetamino - β - dimethylaminopropiophenone

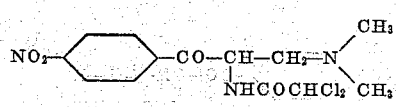

3. p.nitro - α - dichloroacetamino - β - (piperidine)-propiophenone

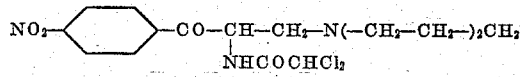

4. A compound of the formula

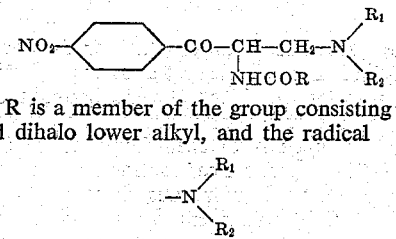

in which R is a member of the group consisting of lower alkyl and dihalo lower alkyl, and the radical $$-N\begin{array}{c}R_1\\ R_2\end{array}$$

is taken from the group consisting of di-lower alkyl amine and radicals in which $R_1$ and $R_2$ are joined to form, with the attached nitrogen atom, a radical of the group consisting of morpholino and piperidino.

References Cited in the file of this patent
FOREIGN PATENTS
770,498    Great Britain _____ Mar. 20, 1957

OTHER REFERENCES

Degering: An Outline of Organic Nitrogen Compounds (1945), p. 305.

Larramona: Compt. Rend., vol. 238, pp. 488–490 (1954).